United States Patent
Ku et al.

(10) Patent No.: US 11,706,735 B2
(45) Date of Patent: Jul. 18, 2023

(54) METHOD AND DEVICE FOR MEASURING POSITION USING BEAMFORMING

(71) Applicant: LG ELECTRONICS INC., Seoul (KR)

(72) Inventors: Gwanmo Ku, Seoul (KR); Sangwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 16/956,536

(22) PCT Filed: Dec. 21, 2017

(86) PCT No.: PCT/KR2017/015210
§ 371 (c)(1),
(2) Date: Jun. 19, 2020

(87) PCT Pub. No.: WO2019/124588
PCT Pub. Date: Jun. 27, 2019

(65) Prior Publication Data
US 2022/0141795 A1    May 5, 2022

(51) Int. Cl.
*H04W 64/00* (2009.01)
*H04B 7/0404* (2017.01)

(52) U.S. Cl.
CPC ........ *H04W 64/006* (2013.01); *H04B 7/0404* (2013.01)

(58) Field of Classification Search
CPC ............................ H04W 64/006; H04B 7/0404
See application file for complete search history.

(56) References Cited

U.S. PATENT DOCUMENTS

| | | |
|---|---|---|
| 2013/0324154 A1 | 12/2013 | Raghupathy et al. |
| 2016/0295366 A1* | 10/2016 | Priyanto ............... H04W 4/023 |
| 2017/0104517 A1 | 4/2017 | Kakishima et al. |
| 2017/0374637 A1* | 12/2017 | Akkarakaran ........... G01S 5/10 |
| 2018/0310127 A1* | 10/2018 | Xia ....................... H04W 24/10 |

FOREIGN PATENT DOCUMENTS

| | | |
|---|---|---|
| WO | 2015/027118 | 2/2015 |
| WO | 2015/096809 | 7/2015 |
| WO | 2017/164925 | 9/2017 |

OTHER PUBLICATIONS

PCT International Application No. PCT/KR2017/015210, International Search Report dated Sep. 21, 2018, 2 pages.

* cited by examiner

*Primary Examiner* — Kabir A Timory
(74) *Attorney, Agent, or Firm* — Lee Hong Degerman Kang Waimey

(57) ABSTRACT

According to one embodiment of the present disclosure, there is provided a method in which a terminal transmits position measurement information in a radio communication system. The method that is performed by the terminal includes triggering a beam positioning mechanism, receiving a beam positioning-related signal from a base station, measuring the beam positioning-related signal, acquiring position measurement information based on the measured beam positioning-related signal, and transmitting the acquired position measurement information to the base station. The position measurement information is acquired based on beamforming configuration.

10 Claims, 11 Drawing Sheets

(a)

(b)

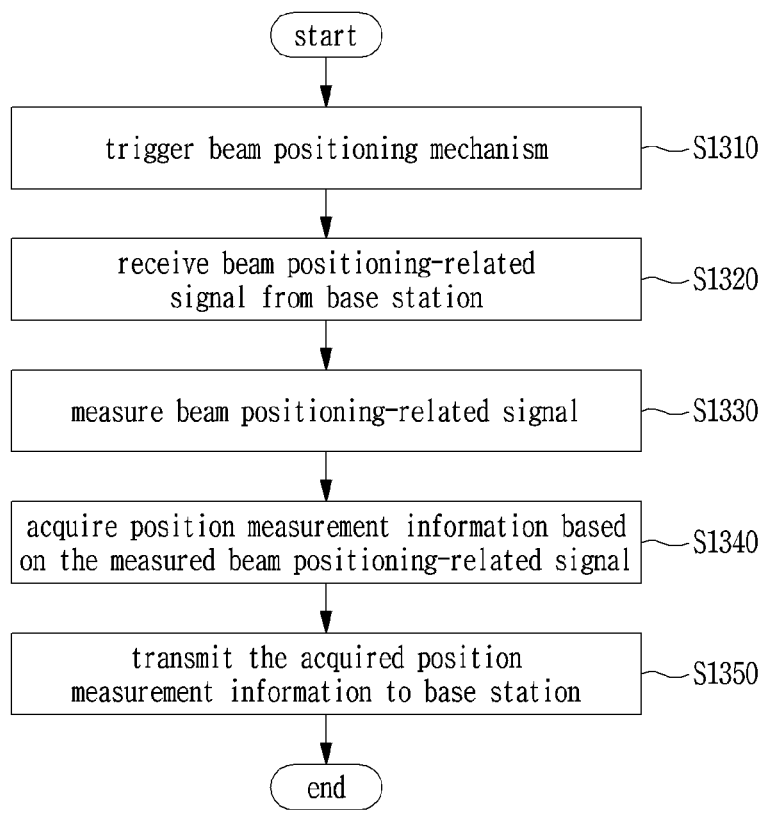

METHOD AND DEVICE FOR MEASURING POSITION USING BEAMFORMING

CROSS-REFERENCE TO RELATED APPLICATIONS

This application is the National Stage filing under 35 U.S.C. 371 of International Application No. PCT/KR2017/015210, filed on Dec. 21, 2017, the contents of which are all hereby incorporated by reference herein in its entirety.

TECHNICAL FIELD

The present disclosure relates to a wireless communication system and, more particularly, to a beamforming-based position measuring method and device.

BACKGROUND ART

Wireless communication systems are widely used to provide various kinds of communication services such as transmission of voice or data. General radio communication systems are multiple-access systems that support communication with multiple users by sharing available system resources (for example, bandwidth, transmission power, etc.) Examples of the multiple access system include a code division multiple access (CDMA) system, a frequency division multiple access (FDMA) system, a time division multiple access (TDMA) system, an orthogonal frequency division multiple (OFDMA) system, a single carrier frequency division multiple access (SC-FDMA) system, and a multi-carrier frequency division multiple access (MC-FDMA) system.

Among radio communication systems, a third generation partnership project long term evolution (3GPP LTE) system uses a frame structure with a transmission time interval (TTI) of 1 ms, and it is required to meet a latency of 10 ms or lower for video service applications. However, due to emergence of new applications such as real-time control and tactile Internet service, future-generation 5G technology is required to meet a further reduced latency for data transmission. 5G technology is expected to ultimately achieve a latency of 1 ms or lower. In addition, the future-generation 5G technology is also required to satisfy an increased connectivity which is the ability of a single base station to connect to an increased number of terminals (i.e., user equipment), and it is expected that the 5G technology provides a maximum connectivity of 1,000,000/km$^2$.

In addition, as more communication devices require a larger communication capacity, there is a need for enhanced mobile broadband communication technology that improves upon a conventional radio access technology (RAT). In addition, the design of a communication system capable of supporting services/UEs that are sensitive to reliability and latency is being discussed. As such, the introduction of next-generation radio access technology (RAT) reflecting enhanced mobile broadband communication (eMBB), massive MTC (mMTC), and ultra-reliable and low latency communication (URLLC) is being discussed. Hereinafter, this next-generation RAT will be referred as a New RAT.

DISCLOSURE

Technical Problem

An objective of the present disclosure is to provide a method of measuring a position using beamforming technology in a wireless communication system.

Another objective of the present disclosure is to provide a method of transmitting information about position measurement.

A further objective of the present disclosure is to provide a method of transmitting information about position measurement based on a beam.

Technical Solution

According to one embodiment of the present disclosure, there is provided a method in which a terminal transmits position measurement information in a radio communication system. The method includes: triggering, by the terminal a beam positioning mechanism; receiving, by the terminal, a beam positioning-related signal from a base station; measuring the beam positioning-related signal; acquiring the position measurement information based on the measured beam positioning-related signal; and transmitting the acquired position measurement information to the base station, wherein the position measurement information is acquired based on beamforming configuration.

According to one embodiment of the present disclosure, there is provided a terminal that transmits position measurement information in a radio communication system. The terminal configured to transmit the position measurement information may include a receiver configured to receive a signal, a transmitter configured to transmit a signal, and a processor configured to control operation of the receiver and operation of the transmitter. The processor may trigger a beam positioning mechanism, receive a beam positioning-related signal from a base station, measure a beam positioning-related signal, acquire position measurement information based on the measured beam positioning-related signal, and transmit the acquired position measurement information to the base station, in which the position measurement information is acquired based on beamforming configuration.

Details described below may be common between a beamforming-based position measuring method and a beamforming-based position measuring device in a radio communications system.

According to one embodiment of the present disclosure, a terminal may receive information on a beam positioning mechanism from a base station before triggering the beam positioning mechanism.

According to one embodiment of the present disclosure, the information on the beam positioning mechanism may include at least one of the number of available beams, angle information of each of beams, altitude information from which a beam is transmitted at the base station, and/or the beamforming configuration information.

According to one embodiment of the present disclosure, the terminal may trigger the beam positioning mechanism when receiving system control information or system information containing information for triggering the beam positioning mechanism, from the base station.

According to one embodiment of the present disclosure, the system information or control information may include information for indicating a specific value in the beamforming configuration, and the terminal may measure a beam positioning-related signal based on the specific value.

According to one embodiment of the present disclosure, the beamforming configuration is composed of two bits. The terminal may measure a beam positioning-related signal from multiple beams that are carried by one carrier when the beamforming configuration has a first value, may measure a beam positioning-related signal from a beam that is carried by multiple carriers when the beamforming configuration has a second value, and may measure a beam positioning-related signal from multiple beams that are carried by multiple carriers when the beamforming configuration has a third value.

According to one embodiment of the present disclosure, when the beamforming configuration has the first value, the terminal may acquire distance information of the position measurement information based on power information of the multiple beams and, and acquire direction information of the position measurement information from an antenna array of the terminal.

According to one embodiment of the present disclosure, when the beamforming configuration has the second value, the terminal may acquire distance information of the position measurement information based on power information of each of the multiple beams carried respectively by the multiple carriers, and acquire direction information of the position measurement information from an antenna array of the terminal.

According to one embodiment of the present disclosure, when the beamforming configuration has the third value, the terminal may acquire distance information of the position measurement information based on power information of each of the multiple beams that are transmitted by the multiple carriers, and acquire direction information of the position measurement information from an antenna array of the terminal.

According to one embodiment of the present disclosure, when the terminal transmits position information to the base station, the position information is shared with other base stations.

Advantageous Effects

The present disclosure provides a method of performing position measurement using beamforming in a wireless communication system.

The present disclosure provides a method of transmitting information regarding position measurement.

The present disclosure provides a method of transmitting information regarding position measurement by using beamforming.

The effects and advantages that can be achieved by the present disclosure are not limited to the ones mentioned above, and other effects and advantages which are not mentioned above but can be achieved by the present disclosure can be clearly understood by those skilled in the art from the following description.

DESCRIPTION OF DRAWINGS

The accompanying drawings, which are included as part of the detailed description to aid understanding of the present disclosure, provide embodiments of the present disclosure and describe the technical spirit of the present disclosure together with the detailed description herein.

FIG. 13 is a diagram illustrating a method of transmitting information required to measure a position of a terminal.

BEST MODE

Figure 1:
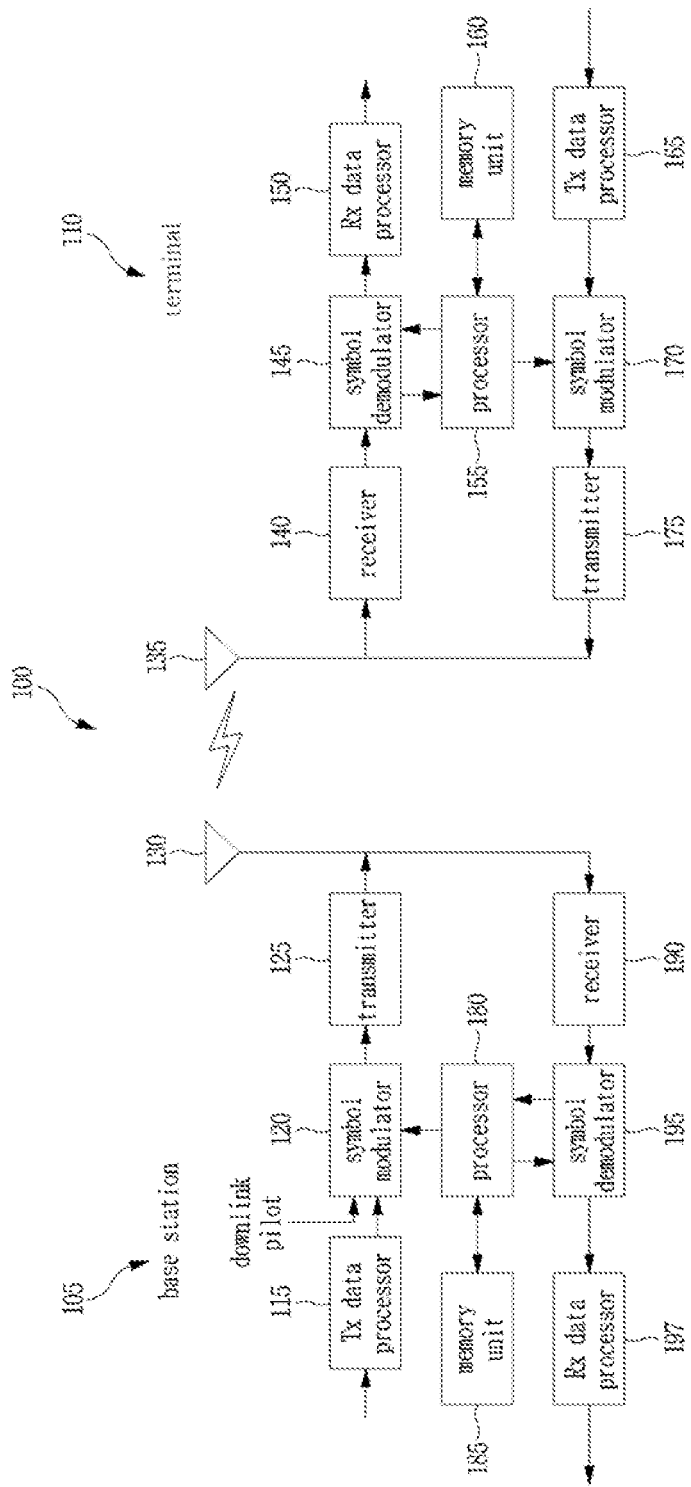
FIG. 1 is a block diagram illustrating the construction of a terminal and the construction of a base station 105 within a radio communication system 100.

Hereinafter, preferred embodiments of the present disclosure will be described in detail with reference to the accompanying drawings. The following detailed description, together with the accompanying drawings, is intended to describe exemplary embodiments of the present disclosure, and is not intended to represent the only embodiment of the present disclosure. The following detailed description includes specific details to provide a thorough understanding of the present disclosure. However, the ordinarily skilled in the art know that the present disclosure can be practiced without these specific details. The following description assumes that a mobile communications system is a 3GPP LTE or LTE-A system but the following description, except for description about the unique characteristics of the 3GPP LTE and LTE-A systems, also applies to any other mobile communications systems as well as 3GPP LTE or LTE-A systems.

In some cases, in order to avoid obscuring the concept of the present disclosure, well-known structures and devices may not be described or illustrated at all, or only the key functions thereof may be schematically illustrated as block diagrams. Throughout the description, like components are designated by like reference numerals.

In the following description, it is assumed that a terminal is a generic term referring to any mobile or stationary terminal, such as a user equipment (UE), a mobile station (MS), and an advanced mobile station (AMS). In addition, it is assumed that a base station is a generic term referring to any node, such as a Node B, an eNode B, a base station (BS), an access point (AP), which is disposed at an endpoint of a network.

In a mobile communication system, a terminal (for example, UE) receives information along a downlink (DL) and transmits information along an uplink (UL). Information transmitted or received by a terminal includes, for example, data and control information. Various physical channels are used depending on the type or use of information transmitted or received by a terminal.

The technology described below can be used in various radio access systems, such as a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system. Code division multiple access (CDMA) is used in radio communications technologies such as CDMA2000. Time division multiple access (TDMA) is used in radio communications technologies such as global system for mobile communications (GSM), general packet radio service (GPRS), and enhanced data rates for GSM evolution (EDGE). Orthogonal frequency division multiple access (OFDMA) is used in radio technologies such as IEEE 802.11 (Wi-Fi), IEEE 892.16 (WiMAX), and IEEE 802.20 (MobileFi), and evolved UTRA (E-UTRA). UTRA is part of a universal mobile telecommunications system (UMTS).

3rd generation partnership project (3GPP) long term evolution (LTE) is part of evolved UMTS (E-UMTS) that uses E-UTRA. The 3GPP LTE adopts OFDMA for a downlink and SC-FDMA for an uplink. LTE-A(advanced) is an upgraded version of LTE.

Specific terms in the following description are used to help understanding of the present disclosure, and these specific terms may be substituted by other terms without departing from the technical spirit of the present disclosure.

Pertaining to radio transmission between a base station and a terminal, transmission from the base station to the terminal is referred to as downlink transmission and transmission from the terminal to the base station is referred to as uplink transmission. Duplexing is defined as a way of allocating separate radio resources for uplink transmission and downlink transmission, respectively for bidirectional communication. Frequency division duplexing (FDD) means a way of using different carrier frequency bands for uplink transmission and downlink transmission for bidirectional communication. The technology proposed by the present disclosure applies not only to frequency division duplexing but also time division duplexing (TDD) that uses an uplink transmission time zone and a downlink transmission time zone for bidirectional communication and full duplexing in which frequency resources and time resources are shared for bidirectional communication.

FIG. 1 is a block diagram illustrating the construction of a terminal 110 and the construction of a base station 105 in a radio communications system 100.

To schematically show the radio communications system 100, one base station 105 and one terminal 110 are illustrated. However, the radio communications system 100 may include a number of base stations and/or a number of terminals.

Referring to FIG. 1, the base station 105 includes a transmission data processor 115, a symbol modulator 120, a transmitter 125, a transceiving antenna 130, a processor 180, a memory 185, a receiver 190, a symbol demodulator 195, and a reception data processor 197.

Referring to FIG. 1, the terminal 110 includes a transmission data processor 165, a symbol modulator 170, a transmitter 175, a transceiving antenna 135, a processor 155, a memory 160, a receiver 140, a symbol demodulator 155, and a reception data processor 150. The illustration shows that the base station 105 is equipped with only one transceiving antenna 130 and the terminal 110 is also equipped with only one transceiving antenna 135, each of the base station 105 and the terminal 110 may be equipped with an array of transceiving antennas. Therefore, the base station 105 and the terminal 110 according to the present disclosure support a multiple-input-multiple-output (MIMO) mode. The base station 105 according to the present disclosure supports both a single user MIMO (SU-MIMO) mode and a multi-user MIMO (MU-MIMO) mode.

The transmission data processor 115 receives traffic data on a downlink, formats the received traffic data, codes the formatted traffic data, modulates the coded traffic data through interleaving (i.e., symbol mapping), and provides the modulated symbols (i.e., data symbols). The symbol modulator 120 receives and processes the data symbols and pilot symbols and provides a stream of symbols.

The symbol modulator 120 multiplexes the data symbols and the pilot symbols and transfers the resulting transmission symbols to the transmitter 125. Each of the transmission symbols may be a data symbol, a pilot symbol, or a signal value of zero. The pilot symbols may be continuously transmitted during each symbol period. The pilot symbols may include a frequency division multiplexing (FDM) symbol, an orthogonal frequency division multiplexing (OFDM) symbol, a time division multiplexing (TDM) symbol, and a code division multiplexing (CDM) symbol.

The transmitter 125 receives a stream of symbols, converts the stream into one or more analog signals, adjusts (specifically, amplifies, filters, and/or frequency-up-converts) the analog signals, and generates a downlink signal suitable for transmission through a radio channel. The transmitting antenna 130 transmits the downlink signal to the terminal.

In the terminal 110, the receiving antenna 135 receives the downlink signal transmitted from the base station and transfers it to the receiver 140. The receiver 140 adjusts (specifically, filters, amplifies, and/or down-converts) the signal and digitalizes the adjusted signal, thereby generating samples. The symbol demodulator 145 demodulates pilot symbols and sends the demodulated pilot symbols to the processor 155 for use in channel estimation.

The symbol demodulator 145 receives a frequency response estimation value for a downlink from the processor 155, performs data demodulation with respect to the received data symbols to obtain data symbol estimation values that are estimated values with respect to the received data symbols, and transfers the data symbol estimation values to the reception data processor 150. The reception data processor 150 demodulates (i.e., demaps), deinterleaves, and decodes the data symbol estimation values to reconstruct traffic data. The processing of the symbol demodulator 145 and the reception data processor 150 in the terminal is complementary to the processing of the symbol modulator 120 and the transmission data processor 115 in the base station 105.

In the terminal 110, during an uplink session, the transmission data processor 165 processes traffic data and provides data symbols. The symbol modulator 170 receives, multiplexes, and modulates the data symbols, and transfers a stream of symbols to the transmitter 175. The transmitter 175 receives and processes the stream of symbols and generates an uplink signal. The transmitting antenna 135 transmits the uplink signal to the base station 105. In each of the terminal and the base station, the transmitter and the receiver may be implemented with a single radio frequency (RF) unit.

In the base station 105, the receiving antenna 130 receives the uplink signal from the terminal 110 and transfers the uplink signal to the receiver 190, and the receiver 190 processes the uplink signal to obtain samples. The symbol demodulator 195 processes the samples and provides the received pilot symbols and a data symbol estimation value for an uplink. The reception data processor 197 processes the data symbol estimation value to reconstruct the traffic data transmitted by the terminal 110.

The processors 155 and 180 respectively provided in the terminal 110 and the base station 105 instruct operations (for example, control, adjustment, management, etc.) to be performed in the terminal 110 and the base station 105, respectively. The processors 155 and 180 are respectively connected to memory units 160 and 185 that store program codes and data. The memory units 160 and 185 are connected to the processor 180 and store operating systems (OSs), applications, and data files.

The processors 155 and 180 may also be referred to as controllers, microcontrollers, microprocessors, microcomputers, etc. The processors 155 and 180 may be implemented by hardware, firmware, software, or any combination thereof.

When embodiments of the present disclosure are implemented in hardware, application specific integrated circuits (ASICs), digital signal processors (DSPs), digital signal processing devices (DSPDs), programmable logic devices (PLDs), field programmable gate arrays (FPLDs), or the like are provided in the processors 155 and 180.

On the other hand, when embodiments of the present disclosure are implemented in firmware or software, a firmware component or a software component may be configured to include modules, procedures, functions, etc. for executing functions or operations of the embodiments of the present disclosure. The firmware or software components configured to implement the present disclosure are provided in the processors 155 and 180, respectively. Alternatively, the firmware or software components may be stored in the memory units 160 and 185 and executed by the processors 155 and 180, respectively.

Layers of a radio interface protocol between a radio communication system (i.e., network) and each of the terminal and the base station are categorized into a first layer L1, a second layer L2, and a third layer L3 that are three basic layers of an open system interconnection (OSI) model that is well known in the field of communication systems. A physical layer belongs to the first layer and provides information transmission service through a physical channel. A radio resource control (RRC) layer belongs to the third layer and provides control radio resources between a UE and a network. The terminal or the base station exchanges RRC messages with a radio communication network through the RRC layer.

Although the processors 155 in the terminal and the processor 180 in the base station perform signal and data processing other than transmitting and receiving signals to and from the terminal 110 and the base station 105, the operations of the processors 155 and 180 will not be mentioned hereinbelow to simplify the description of the embodiments of the present disclosure. Therefore, although the processors 155 and 180 are not mentioned herein below, it should be construed that a series of operations such as data processing except for transmission and reception of signals is performed by the processors 155 and 180.

Figure 2:
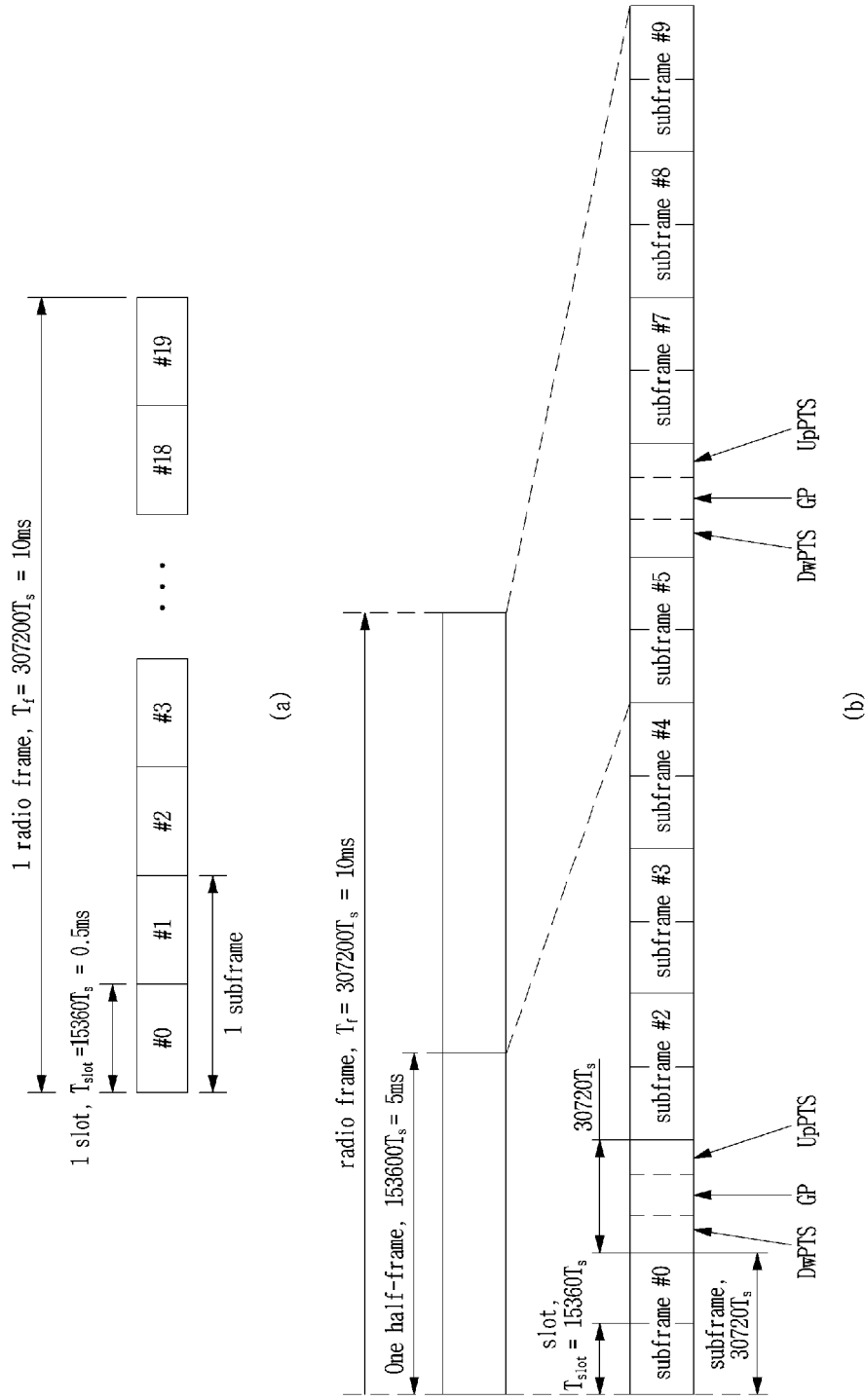
FIG. 2 is a diagram illustrating an example of a radio frame structure used in a radio communication system.

FIG. 2 is a diagram illustrating an example of a radio frame structure used in a radio communication system. Particularly, FIG. 2A illustrates the structure of a frame for frequency division duplexing (FDD) used in a 3GPP LTE/LTE-A system, and FIG. 1B illustrates the structure of a frame for time division duplexing (TDD) used in a 3GPP LTE/LTE-A system.

Referring to FIG. 2, a radio frame used in a 3GPP LTE/LTE-A system has a length of 10 ms (307200 Ts) and is composed of ten subframes (SFs) having an equal size. The ten subframes in one radio frame are numbered. Ts is a sampling time and Ts=1/(2048*15 kHz). Each subframe has a length of 1 ms and is composed of two slots. The twenty slots in one radio frame are numbered from 0 to 19, respectively. Each slot has a length of 0.5 ms. A transmission time that is taken to transmit one subframe is defined as a transmission time interval (TTI). Time resources are distinguished from each other by radio frame numbers (or called radio frame indexes), subframe numbers (or called subframe numbers), slot numbers (or called slot indexes), etc.

The configuration of a radio frame varies depending on a duplex mode. For example, in FDD mode, since downlink transmission and uplink transmission are distinguished by carrier frequencies, a radio frame for a specific frequency band includes only either a downlink subframe or an uplink subframe. In TDD mode, since downlink transmission and uplink transmission are distinguished by times, a radio frame for a specific frequency band includes both a downlink subframe and an uplink subframe.

Table 1 shows downlink-uplink (DL-UL) configuration of subframes within a radio frame.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a downlink subframe, U represents an uplink subframe, and S represents a special subframe. The special subframe includes three fields including a downlink pilot time slot (DwPTS), a guard period (GP), and uplink pilot time slot (UpPTS). DwPTS is a reserved time period for downlink transmission and UpPTS is a reserved time period for uplink transmission. Table 2 shows an example of the configuration of a special frame.

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | | Normal cyclic prefix in uplink | Extended cyclic prefix in uplink | DwPTS | Normal cyclic prefix in uplink | Extended cyclic prefix in uplink |
| 0 | $6592 \cdot T_s$ | | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | | $20480 \cdot T_s$ | | |
| 2 | $21952 \cdot T_s$ | | | | $23040 \cdot T_s$ | | |
| 3 | $24144 \cdot T_s$ | | | | $25600 \cdot T_s$ | | |

TABLE 2-continued

| | | Normal cyclic prefix in downlink | | | Extended cyclic prefix in downlink | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Table 2 shows an example of a DL/UL slot structure in a radio communication system. Specifically, FIG. 2 illustrates a resource grid of a 3GPP LTE/LET-A system. One antenna port corresponds to one resource grid.

Figure 3:
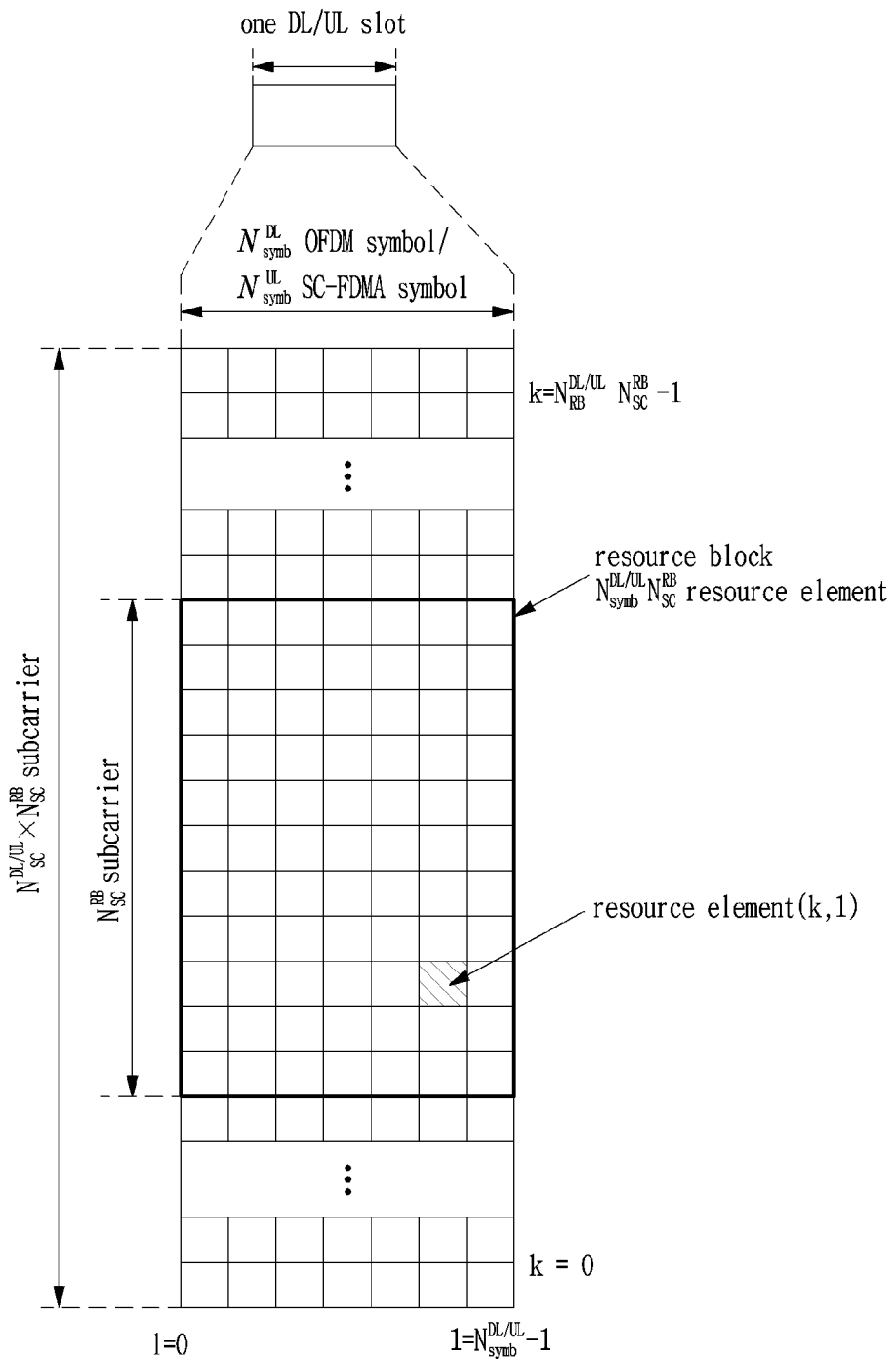
FIG. 3 is a diagram illustrating an example of a downlink/uplink slot structure in a radio communication system.

Referring to FIG. 3, one slot includes a plurality of OFDM symbols in time domain and a plurality of resource blocks (RBs) in frequency domain. One OFDM symbol means a period of one symbol. Referring to FIG. 3, a signal transmitted in each slot is represented as a resource grid composed of $N_{RB}^{DL/UL} * N_{sc}^{RB}$ subcarriers and $N_{symb}^{DL/UL}$ OFDM symbols. Here, $N_{RB}^{DL}$ represents the number of resource blocks in a downlink slot, and $N_{RB}^{UL}$ represents the number of resource blocks in an uplink slot. $N_{RB}^{DL}$ and $N_{RB}^{UL}$ respectively depend on a DL transmission bandwidth and an UL transmission bandwidth. $N_{symb}^{DL}$ represents the number of OFDM symbols in a DL slot, and $N_{RB}^{UL}$ represents the number of OFDM symbols in a UL slot. $N_{sc}^{RB}$ represents the number of subcarriers that constitute one resource block.

OFDM symbols are referred to as OFDM symbols or SC-FDM (single carrier frequency division multiplexing) symbols depending on a multiple access scheme. The number of OFDM symbols included in one slot varies depending on the channel bandwidth and the length of a cyclic prefix (CP). For example, in the case of a normal CP, one slot includes 7 OFDM symbols, but in the case of an extended CP, one slot includes 6 OFDM symbols. Although FIG. 3 illustrates an example of a subframe in which one slot is composed of 7 OFDM symbols for convenience of description, embodiments of the present disclosure can be applied to subframes having different numbers of OFDM symbols. Referring to FIG. 3, each OFDM symbol includes $N_{RB}^{DL/UL} * N_{sc}^{RB}$ subcarriers in frequency domain. There are three types of subcarriers: data subcarriers for transmission of data; reference signal subcarriers for transmission of reference signals; and null subcarriers for guard bands and direct current (DC) components. The null subcarrier for the DC component is a subcarrier that remains unused, and is mapped to a carrier frequency (f0) in an OFDM signal generation process or a frequency upconversion process. The carrier frequency is also called a center frequency.

One RB is defined as $N_{symb}^{DL/UL}$ (for example, seven) consecutive OFDM symbols in time domain, and is defined as c (for example, 12) consecutive subcarriers in frequency domain. For reference, a resource composed of one OFDM symbol and one subcarrier is called a resource element (RE) or tone. Therefore, one RB is composed of $N_{symb}^{DL/UL} * N_{sc}^{RB}$ resource elements. Each resource element in the resource grid can be uniquely defined by an index pair (k, l) in one slot. Where k is an index in frequency domain and it ranges from 0 to $N_{RB}^{DL/UL} * N_{sc}^{RB} - 1$ in frequency domain, and l is an index in time domain and it ranges from 0 to $N_{symb}^{DL/UL} - 1$.

Two RBs that occupy $N_{sc}^{RB}$ consecutive same subcarriers in one subframe and which are respectively disposed in two slots in the subframe is referred to as a physical resource block (PRB) pair. Two RBs constituting one PRB pair have the same PRB number (or PRB index). A virtual resource block (VRB) is a kind of a basic unit for logical resource allocation. The VRB and the PBR have the same size. Depending on a method of mapping the VRBs to the PRBs, the VRBs are categorized into two types: localized and distributed. The localized VRBs are directly mapped to the PRBs. Therefore, the VRB numbers (also referred to as VRB indexes) directly correspond to the PRB numbers, respectively. That is, nPRB=nVRB. The localized VRBs are numbered, starting from $N_{VRB}^{DL} - 1$, and $N_{VRB}^{DL} = N_{RB}^{DL}$. Therefore, according to the localization mapping method, VRBs having the same VRB number are respectively mapped to PRBs that have the same PRB number and are respectively provided in the first slot and the second slot. On the other hand, the distributed VRBs are mapped to the PRBs through interleaving. The distributed VRBs having the same VRB number are respectively mapped to PRMb that have different PRB numbers and are respectively in the first slot and the second slot. Two PRBs that are respectively positioned in two slots of a subframe and which have the same VRB number are called a VRB pair.

Figure 4:
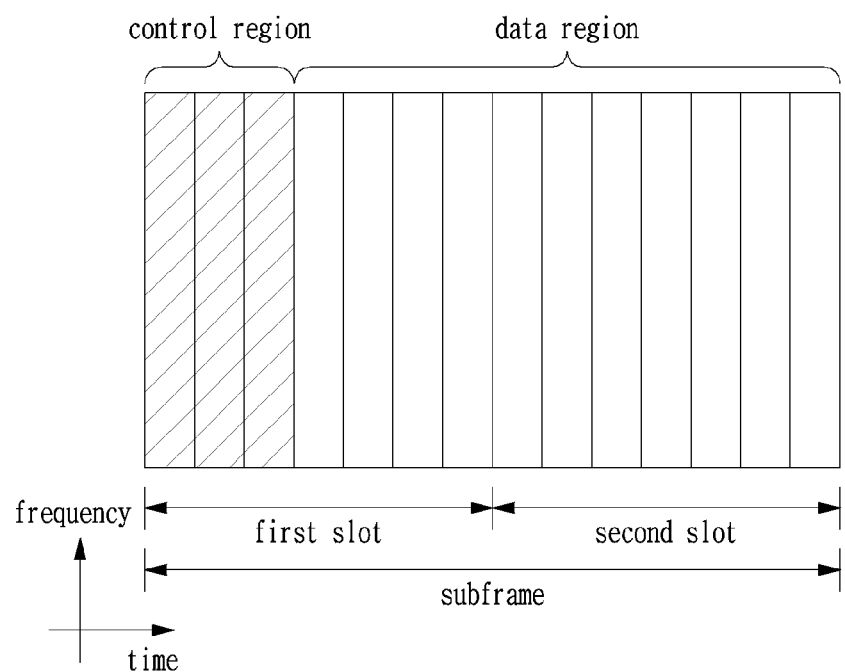
FIG. 4 is a diagram illustrating an example of a downlink subframe structure used in a 3GPP LTE/LTE-A system.

FIG. 4 is a diagram illustrating an example of a downlink (DL) subframe structure used in a 3GPP LTE/LTE-A system.

Referring to FIG. 4, a DL subframe is divided into a control region and a data region in the time domain. Referring to FIG. 3, a maximum of three (or four) OFDM symbols positioned at a head portion in the first slot of the subframe correspond to the control region for which a control channel is allocated. Herein, in the DL subframe, a resource region that can be used for PDCCH transmission is referred to as a PDCCH region. The rest OFDM symbols other than the OFDM symbols used for the control region correspond to a data region for which a physical downlink shared channel (PDSCH) is allocated. Herein, in the DL subframe, a resource region that can be used for PDSCH transmission is referred to as a PDSCH region. Examples of the DL control channel used in a 3GPP LET system include a physical control format indicator channel (PCFICH), a physical downlink control channel (PDCCH), and a physical hybrid ARQ indicator channel (PHICH). The PCFICH is transmitted ahead of the first OFDM symbol and carries information on the number of OFDM symbols used for a control channel. The PHICH carries a HARQ ACK/NACK signal as a reply to the UL transmission. The HARQ ACK/NACK stands for hybrid automatic repeat request acknowledgement/negative-acknowledgement.

The control information carried through the PDCCH is referred to as downlink control information (DCI). The DCI includes resource allocation information for a UE or a UE group and other control information. For example, the DCI includes information on transmission format and resource allocation of a downlink shared channel (DL-SCH), information on transmission format and resource allocation of an uplink shared channel (UL-SCH), paging information on a paging channel (PCH), system information on the DL-SCH, resource allocation information of an upper layer control message, such as a random access response transmitted on the PDSCH, a transmission control command set for each UE in a UE group, a transmission power control command, voice over IP (VoIP) activation instruction information, and downlink assignment index (DAI). The information on the transmission formation and resource allocation of the DL-SCH is also referred to as DL scheduling information or DL grand. The information on the transmission formation and resource allocation of the UL-SCH is also referred to as UL scheduling information of UL grant. The DCI carried through one PDCCH varies in size and function depending on the DIC format. The size changes with a coding rate. In a 3GPP LTE system, various formats are defined: 0 and 4 for UL; and 1, 1A, 1B, 1C, 1D, 2, 2A, 2B, 2C, 3, and 3A for DL. According to the function of each DCI format, a selected combination of control information is transmitted to a UE as DL control information, in which the control information includes hopping flag, resource block (RB) allocation, modulation coding scheme (MCS), redundancy version (RV), new data indicator (NDI), transmit power control (TPC)m, cyclic shift demodulation reference signal (CS DMRS), UL index, channel quality information (CQI) request, DL assignment index, HARQ process number, transmitted precoding matrix indicator (TPMI), and precoding matrix indicator (PMI).

Generally, the DCI format that can be transmitted to a UE varies depending on the transmission mode in the UE. In other words, when a UE is configured to have a specific transmission mode, not all of the DCI formats can be used. That is, only several DCI formats supporting to the specific transmission mode can be used.

The PDCCH is transmitted on one control channel element or an aggregation of multiple consecutive channel elements (CCEs). The CCE is a logical allocation unit used to provide a coding rate to the PDCCH in a radio channel state. The CCE corresponds to a plurality of resource element groups (REGs). For example, one CCE corresponds to nine REGs, and one REG corresponds to four REs. In the case of a 3GPP LTE system, a CCE set in which the PDCCH is positioned is defined for each UE. A CCE set from which a UE can find its own PDCCH is called a PDCCH search space or simply a search space (SS). An individual resource by which the PDCCH can be transmitted in a search space is called a PDCCH candidate. A group of PDCCH candidates to be monitored by a UE is defined as a search space. In a 3GPP LTE/LTE-A system, search spaces for the respective DIC formats may have different sizes. There are two types of search spaces: a dedicated search space and a common search space. The dedicated search space is a UE-specific search space and is configured to suit to a corresponding one of the UEs. The common search space is shared by multiple UEs. An aggregation level that defines the search space is shown below.

TABLE 3

| Search Space $S_K^{(L)}$ | | | Number |
|---|---|---|---|
| Type | Aggregation Level L | Size [in CCEs] | of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to one, two, four, or eight CCEs according to a CCE aggregation level. An eNB actually transmits a PDCCH (DCI) on an arbitrary PDCCH candidate within a search space. A UE monitors the search space to find the PDCCH (DCI). The term "monitoring" means attempting to decode each PDCCH in the search space according to the DCI formats that are monitored. A UE monitors multiple PDCCHs and locates its own PDCCH from the multiple PDCCHs. Since a UE does not know whether its own PDCCH is positioned, the UE attempts to decode each of the PDCCHs corresponding to relevant DCIs for each subframe until the UE finds the PDCCH having the identifier thereof. This process is called a blind detection or blind decoding (BD) process.

An eNB transmits data for a UE or a UE group, using a data region. Data that is contained in a data region when transmitted is called user data. To transmit user data, a data region is allocated a physical downlink shared channel (PDSCH). A paging channel (PCH) and a downlink-shared channel (DL-SCH) are transmitted via the PDSCH. A UE reads data transmitted via the PDSCH by decoding control information transmitted via the PDCCH. Information that indicates to which UE or to which UE group the data of the PDSCH is transmitted and how the UE or UE group receives and decodes the data of the PDSCH is contained in the PDCCH that is transmitted. For example, it is assumed that a specific PDCCH is CRC-masked with a radio network temporary identity of "A", and information is transmitted through a specific LD subframe, in which the information pertains to data transmitted using a radio resource of "B" (for example, frequency position) and transmission type information of "C" (for example, transmission block size, modulation scheme, and coding information). The UE monitors PDCCHs based on the RNTI information, detects a PDCCH having an RNTI of "A", and receives a PDSCH indicated by "B" and "C" based on the information of the received PDCCH.

In order for a UE decodes a signal received from an eNB, a reference signal (RS) to be compared with a data signal is required. The reference signal is a predefined wave form signal that is known to both the UE and the eNB and which is transmitted from the UE to the eNB or vice versa. The reference signal is also referred to as a pilot signal. There are two types of reference signals: a cell-specific reference signal that is shared by all UEs within a specific cell; and a demodulation reference signal (DM RS) that is dedicated to a specific UE. A DM RS that is transmitted to a specific UE, for demodulation of downlink data, from an eNB is specifically called a UE-specific RS. In a downlink session, either one or both of a DM RS and a CRS are transmitted. When only a DM RS is transmitted through a downlink, since the DM RS that is precoded in the same way as data and then transmitted can be used only for the purpose of decoding, an RS for channel estimation must be separated provided. For example, in a 3GPP LTE(-A) system, in order for a UE to estimate a channel state, a CSI-RS that is a reference signal for channel estimation is transmitted to the UE. Given that the CSI-RS does not significantly change over time according to a channel state, unlike a CRS that is transmitted for each subframe, the CSI-RI is transmitted at predetermined time intervals, i.e., every after several subframes.

Figure 5:
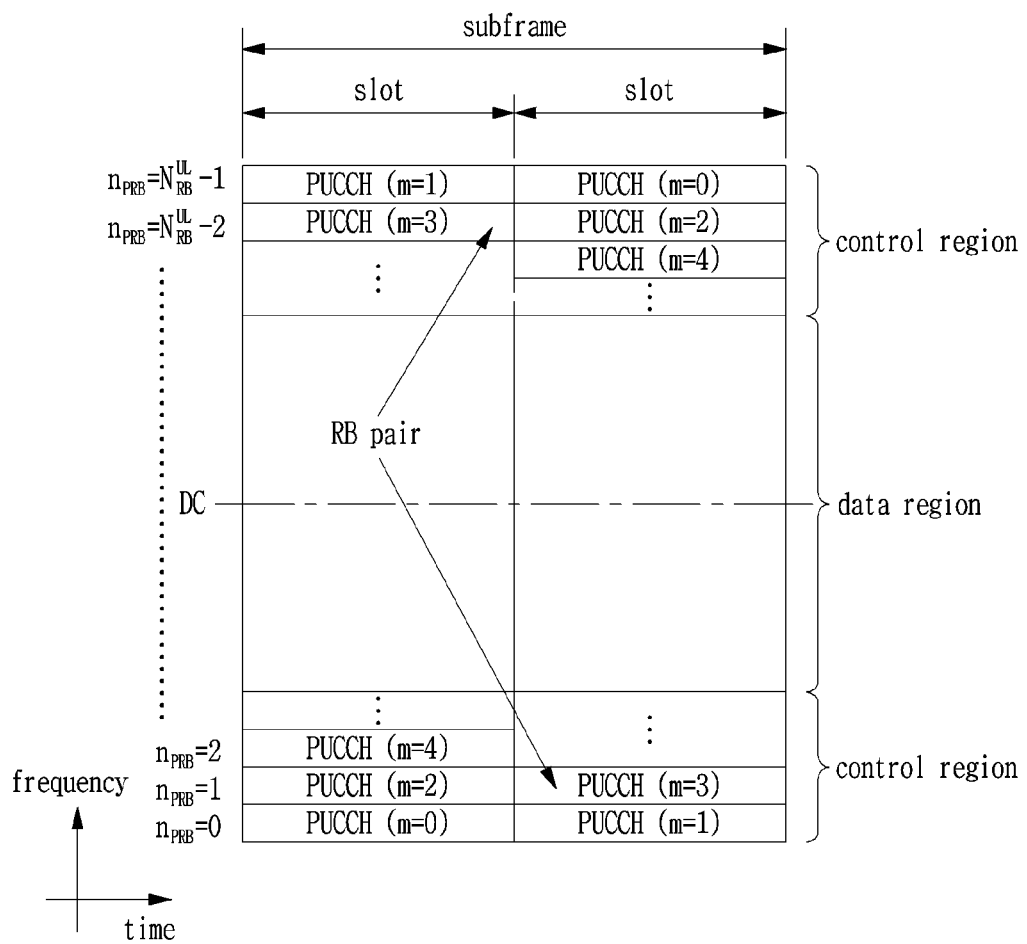
FIG. 5 is a diagram illustrating an example of an uplink subframe structure used in a 3GPP LTE/LTE-A system.

FIG. 5 is a diagram illustrating an example of an uplink subframe structure used in a 3GPP LTE/LTE-A system.

Referring to FIG. 5, a UL subframe is divided into a control region and a data region in frequency domain. One or several physical uplink control channels (PUCCHs) may be allocated to the control region to carry uplink control information (UCI). One or several physical uplink shared channels (PUSCHs) may be allocated to the data region of a UL subframe to carry user data.

In a UL subframe, subcarriers that are farther than a direct current (DC) subcarrier are allocated to the control region. That is, subcarriers positioned at both ends of a UL transmission bandwidth are allocated for transmission uplink control information. The DC subcarrier is a remaining component unused for signal transmission and is mapped to a carrier frequency of f0 during frequency upconversion. A PUCCH for one UE is assigned to a RB pair belonging to resources that operate at one carrier frequency in one subframe, and the RBs in the RB pair, which are in respective time slots, occupy different subcarriers. This process is expressed such that the RB pair allocated for the PUCCH is frequency-hopped at a slot boundary. However, when frequency hopping is not applied, the RB pair occupies the same subcarrier.

The PUCCH can be used to transmit control information described below.

Scheduling request (SR): Information used to request an uplink UL-SCH resource. It is transmitted using the On-Off Keying (OOK) technique.

HARQ-ACK: This is a response to the PDCCH and/or to a downlink data packet (e.g., codeword) on the PDSCH. This indicates whether the PDCCH or PDSCH is successfully received. A one-bit HARQ-ACK is transmitted in response to a single downlink codeword, and a two-bit HARQ-ACK is transmitted in response to two downlink codewords. Types of the HARQ-ACK include a positive ACK (simply, ACK), a negative ACK (hereinafter, NACK), a discontinuous transmission (DTX), and a NACK/DTX. Here, the term HARQ-ACK is used interchangeably with HARQ ACK/NACK and ACK/NACK.

Channel state information (CSI): Feedback information for a downlink channel. MIMO-related feedback information includes a rank indicator (RI) and a precoding matrix indicator (PMI).

The amount of uplink control information (UCI) that a UE can transmit in a subframe depends on the number of SC-FDMAs available for transmission of control information. In a subframe, the SC-FDMA available for a UCI refers to the remaining SC-FDMA symbols excluding the SC-FDMA symbols used to transmit a reference signal. In the case of a subframe provided with a sounding reference signal (SRS), the last SC-FDMA symbol is also excluded. The reference signal is used for coherent detection of the PUCCH. The format of the PUCCH diversely varies depending on information that is transmitted.

Table 4 shows the mapping relationship between PUCCH formats and UCIs in an LTE/LTE-A system.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, a PUCCH Format 1 series is mainly used to transmit ACK/NACK information, a PUCCH Format 2 series is mainly used to carry channel state information (CSI) such as CQI, PMI, and RI, and a PUCCH Format 3 series is mainly used to transmit ACK/NACK information.

In a general cellular communication system, various methods for a network to acquire location information of a terminal are used. Typically, in the case of an LTE system, a positioning technique that uses the observed time difference of arrival (OTDOA) is used. This method will be described in detail below. In an LTE system, a terminal receives information about transmission of positioning reference signals (PRSs) of base stations via an upper-layer signal, measures the PRSs transmitted by cells around the terminal, and transmits a reference signal time difference (RSTD) between an arrival time of a PRS signal transmitted from a reference base station and an arrival time of a PRS signal transmitted from a nearby base station, to the nearby base station or the network. The network calculates a position of a terminal based on the RSTD and other kinds of information. In addition, there are other methods such as an assisted global navigation satellite system positioning technique, an enhanced cell-ID (E-CID) technique, and an uplink time difference of arrival (UTDOA) technique. With the use of these positioning techniques, it is possible to provide location-based services (LBSs) such as advertising, location tracking, and emergency communication means, etc.

[LTE Positioning Protocol]

In an LTE system, an LTE positioning protocol (LPP) is defined to support the OTDOA technique. According to the LPP, a terminal is interned of OTDOA assistance data as an information element (IE).

TABLE 5

--ASNISTART
OTDOA-ProvideAssistanceData ::= SEQUENCE {
    otdoa-ReferenceCellInfo        OTDOA-ReferenceCellInfo
        OPTIONAL., --Need ON
    otdoa-NeighbourCellInfo        OTDOA-NeighbourCellInfoList
        OPTIONAL., --Need ON
    otdoa-Error
        OTDOA-Error
    OPTIONAL,
--Need ON

TABLE 5-continued

```
    ...
}
--ASN1STOP
```

Here, "OTDOA-ReferenceCellInfo" means a cell that is a reference cell for RSTD measurement, and is configured as follows.

TABLE 6

```
-- ASN1START
OTDOA-ReferenceCellInfo ::= SEQUENCE {
    physCellId              INTEGER (0..503),
    cellGlobalId            ECGI
    OPTIONAL,               -- Need ON
    earfcnRef               ARFCN-ValueEUTRA
    OPTIONAL,               -- Cond NotSameAsServ0
    antennaPortConfig       ENUMERATED {ports1-or-2,
ports4, ... }
    OPTIONAL,               -- Cond NotSameAsServ1
    epLength                ENUMERATED { normal,
extended, ... },
    prsInfo                 PRS-Info
    OPTIONAL,               -- Cond PRS...,
    [[ earfcnRef-x9a0       ARFCN-ValueEUTRA-v9a0
    OPTIONAL                -- Cond NotSameAsServ2]]
}
-- ASN1STOP
```

Here, the conditional presence is as follows.

TABLE 7

| Conditional presence | Discription |
|---|---|
| NotSameAsServ( ) | This field is absent if earfcnRef-v9a0 is present. Otherwise, the field is mandatory present if the EARFCN of the OTDOA assistance data reference cell is not the same as the EARFCN of the target devices' s current primary cell. |
| NotSameAsServ1 | The field is mandatory present if the antenna port configuration of the OTDOA assistance data reference cell is not the same as the antenna port configuration of the target devices 's current primary cell. |
| NotSameAsServ2 | The field is absent if earfcnRef is present. Otherwise, the field is mandatory present if the EARFCN of the OTDOA assistance data reference cell is note the same as the EARFCN of the target devices' s current primary cell. |
| PRS | The field is mandatory present if positioning reference signals are available data reference cell; otherwise it is not present. |

The OTDOA-ReferenceCellInfo has fields described below.

TABLE 8

OTDOA -ReferenceCellInfo field description physCellId

This field specifies the physical cell identity of the assistance data reference cell.
cellGlobalId This field specifies the ECGI, the globally unique identity of a cell in E-UTRA, of the assistance data reference cell. The server should include this field if it considers that it is needed to resolve ambiguity in the cell indicated by physCellId.
earfcnRef This field specifies the EARFCN of the assistance data reference cell.

TABLE 8-continued

OTDOA -ReferenceCellInfo field description antennaPortConfig

This field specifies whether 1 (or 2) antenna port(s) or 4 antenna ports for cell specific referenc signals (CRS) are used in the assistance data reference cell.
cpLength This field specifies the cyclic prefix length of the assistance data reference cell PRS if the prsInfo field is present, otherwise this field specifies the cyclic prefix length of the assistance data reference cell CRS.
prsInfo This field specifies the PRS configuration of the assistance data reference cell.

The OTDOA-NeighbourCellInfo refers to cells (for example, eNB or TP) that are the targets of RSTD measurement. For this, a maximum of three frequency layers and be used, and each frequency layer can include a maximum of information of a maximum of 24 neighbor cells. That is, it is possible to give information on 72 cells (i.e., 3*24=72) to a terminal.

TABLE 9

```
-- ASN1START
OTDOA-NeighbourCellInfoList ::= SEQUENCE (SIZE (1...FreqLayers))
    OF
OTDOA-NeighbourFreqInfo
OTDOA-NeighbourFreqInfo ::= SEQUENCE (SIZE (1...24)) OF
    OTDOA-
NeighbourCellInfoElement
    OTDOA-NeighbourCellInfoElement ::= SEQUENCE {
    physCellId              INTEGER
    (0...503),
        cellGlobalId        ECGI
    OPTIONAL,               --Need ON
        earfcn              ARFCN-
alueEUTRA OPTIONAL,         --Cond NotSameAsRef0
        cpLength            ENUMERATED
{normal, extended, ...}
    OPTIONAL,               --Cond NotSameAsRef1
    prsInfo                 PRS-Info
    OPTIONAL,               --Cond NotSameAsRef2
    antennaPortConfig       ENUMERATED {ports-
1-or-2, ports-4, ...}
    OPTIONAL,               --Cond NotsameAsRef3
        slotNumberOffset    INTEGER (0..19)
        OPTIONAL,           --Cond NotSameAsRef4
    prs-SubframeOffset      INTEGER (0..1270)
        OPTIONAL            --Cond InterFreq
        expectedRSTD        INTEGER (0...16381),
        expectedRSTD-Uncertainty    INTEGER (0..1023),
        ...,
        [[ earfcn-v9a0      ARFCN-ValueEUTRA-v9a0
        OPTIONAL            --Cond NotSameAsRef5]]
    }
    maxFreqLayers           INTEGER ::- 3
--ASN1STOP
```

Here, the conditional presence is as follows.

TABLE 10

| Conditional presence | Discription |
|---|---|
| NotSameAsRef( ) | The field is absent if earfcn-v9a0 is present. If earfcn-v9a0 is not present, the field is mandatory present if the EARFCN is not the same as for the assistance data reference cell; otherwise it is not present. |

TABLE 10-continued

| Conditional presence | Discription |
|---|---|
| NotSameAsRef1 | The field is mandatory present if the cyclic prefix length is not the same as for the assistance data reference cell; otherwise it is not present. |
| NotSameAsRef2 | The field is mandatory present if the PRS configuration is not the same as for the assistance data reference cell; otherwise it is not present. |
| NotSameAsRef3 | The field is mandatory present if the antenna port configuration is not the same as for the assistance data reference cell; otherwise it is is not present. |
| NotSameAsRef4 | The field is mandatory present if the slot timing is not the same as for the assistance data reference cell; otherwise it is not present. |
| NotSameAsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

The OTDOA-NeighbourCellInfoList includes fields described below.

TABLE 11

OTDOA-NeighbourCellInfoList field description physCellId

This field specifies the physical cell identity of the assistance data reference cell.
cellGlobalId This field specifies the ECGI, the globally unique identity of a cell in E-UTRA, of the assistance data reference cell. The server should include this field if it considers that it is needed to resolve ambiguity in the cell indicated by physCellId.
earfcnRef This field specifies the EARFCN of the assistance data reference cell.
antennaPortConfig This field specifies whether 1 (or 2) antenna port(s) or 4 antenna ports for cell specific referenc signals (CRS) are used in the assistance data reference cell.
cpLength This field specifies the cyclic prefix length of the neighbor cell PRS if PRS are present in this neighbor cell, otherwise this field specifies the cyclic prefix length of CRS in this neighbor cell.
prsInfo This field specifies the PRS configuration of the neighbor cell.
When the EARFCN of the neighbor cell is the same as for the assistance data reference cell, the target device may assume that each PRS positioning occasion in the neighbour cell at least partially overlaps with a PRS positioning occasion in the assistance data reference cell where tha maximum offset between the transmitted PRS positioning occasions may be assumed to not exceed half a subframe.
When the EARFCN of the neighbor cell is the same as for assistance data refernce cell, the target device may assume that this cell has the same PRS periodicity (Tprs) as the assistance data reference cell.

Here, PRS-Info that is an information element that is in both of the OTDOA-ReferenceCellInfo and the OTDOA-NeighbourCellInfo contains PRS information. Specifically, the PRS information includes PRS Bandwidth, PRS Configuration index (IPRS), the number of consecutive downlink subframes, and PRS muting information.

TABLE 12

```
PRS-Info ::= SEQUENCE {
    prs-Bandwidth        ENUMERATED { n6, n15, n25, n50, n75, n100, ... },
    prs-ConfigurationIndex INTEGER (0..4095),
    numDL-Frames         ENUMERATED {sf-1, sf-2, sf-4, sf-6, ...},
    ....
    prs-MutingInfo-r9    CHOICE {
        po2-r9               BIT STRING (SIZE(2)),
        po4-r9               BIT STRING (SIZE(4)),
        po8-r9               BIT STRING (SIZE(8)),
        po16-r9              BIT STRING (SIZE(16)),
        ...
    }
    OPTIONAL             -- Need OP
}
-- ASNISTOP
```

Figure 6:
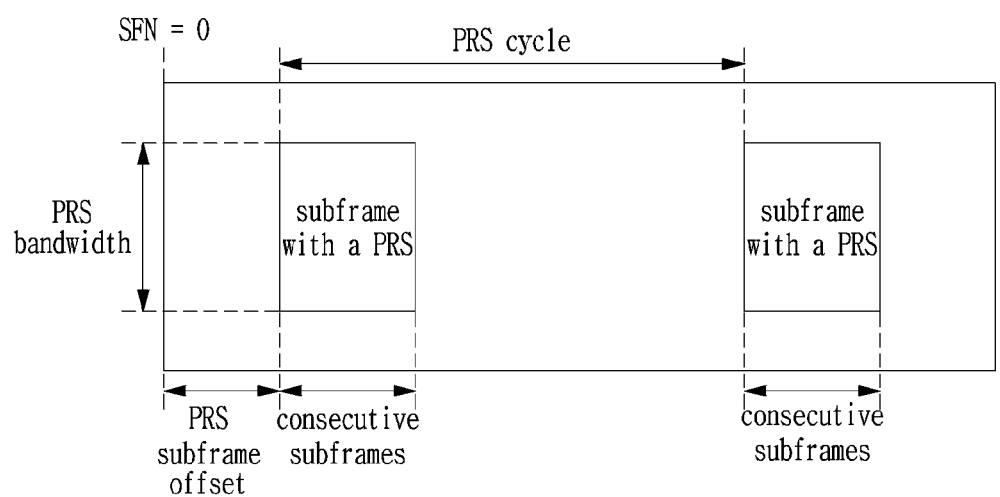
FIG. 6 is a diagram illustrating a positioning reference signal (PRS) transmission structure.

FIG. 6 is a diagram illustrating a frame structure for PRS transmission, reflecting the above parameters.

A PRS periodicity and a PRS subframe offset are determined according to the value of a PRS configuration index (IPRS), and the correspondence relationship is as follows.

TABLE 13

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-23389 | 1280 | $I_{PRS}$-1120 |

[Positioning Reference Signal (PRS)]

A transmission occasion (i.e., positioning occasion) for the PRS occurs at a period of 160, 320, 640, or 1280 ms. For a duration of one positioning occasion, consecutive N DL subframes can be transmitted. Here, N is 1, 2, 4, or 6. The PRS is transmitted at a positioning occasion or muted inter-cell interference control cooperation. PRS muting information is signaled to the terminal UE as prs-MutingInfo. Unlike the system bandwidth of a serving base station, the transmission bandwidth of the PRS can be independently set. The PRS is transmitted within a frequency bandwidth corresponding to a resource block (RB) numbered 6, 15, 25, 50, 75, or 100. A PRS transmission sequence is generated by initializing a pseudo-random sequence generator for each OFDM symbol index, as a function of a slot index, an OFDM symbol index, a cyclic prefix (CP) type, and a cell ID. The generated PRS transmission sequences are differently mapped to resource elements (REs) depending on the CP type, i.e., a general CP or an extended CP. The position of the mapped RE may be shifted on the frequency axis, the amount of the shift is determined depending on the CELL ID.

The UE receives configuration information on a list of PRSs to be searched from a location management server of a network to measure the PRSs. The configuration information includes PRS configuration information of a reference cell and PRS configuration information of neighbor cells. Each PRS configuration information includes an occurrence cycle of a positioning occasion and offset, the number of contiguous DL subframes that constitute a positioning occasion, a cell ID used for generation of a PRS sequence, a CP type, and the number of CRS antenna ports considered when PRS is mapped. In addition to this, the PRS configuration information of the neighboring cells includes a slot offset and a subframe offset between a neighboring cell and a reference cell, an anticipated RSTD, and the extent of uncertainty of the anticipated RSTD. This information aids a UE to determine timing and a time window for detecting a PRS transmitted from the neighboring cell.

Figure 7:
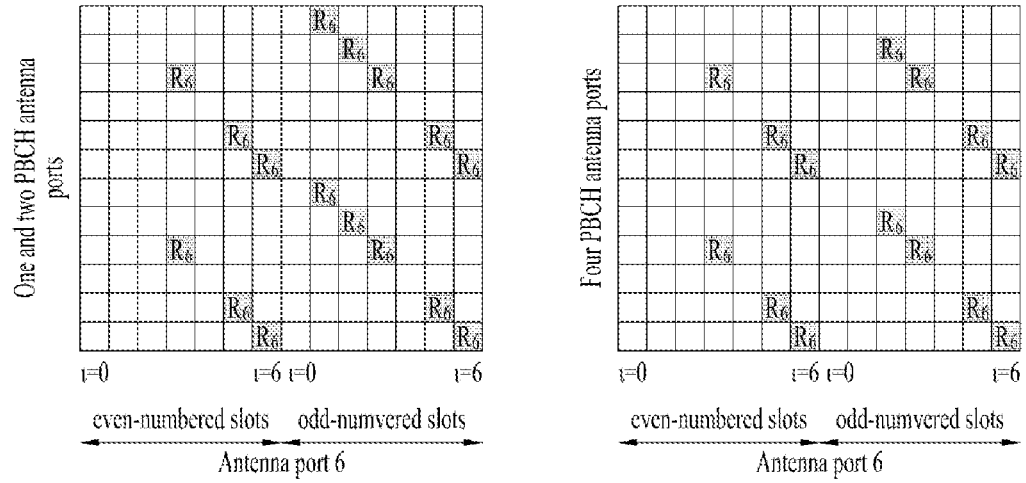
FIG. 7 is a diagram illustrating a PRS resource element mapping method.
Figure 7:
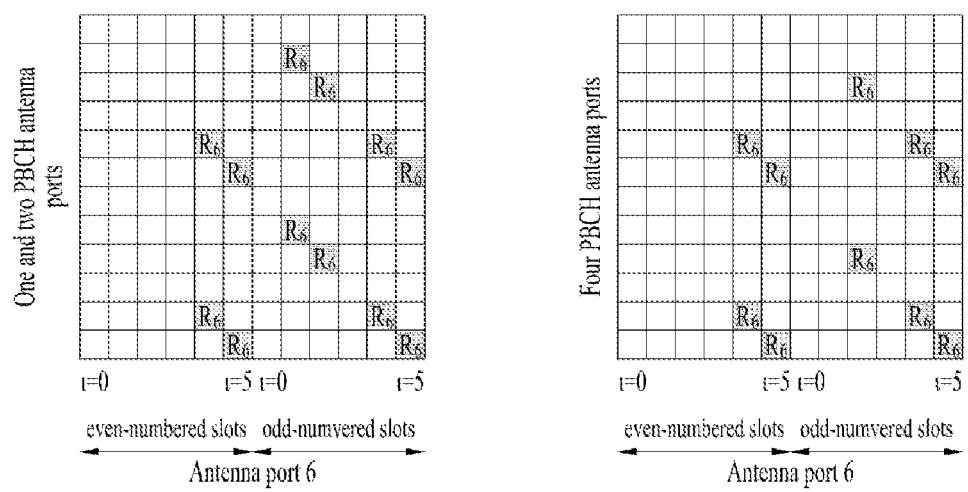

As an example, FIG. 7 is a diagram illustrating that a PRS is mapped to a resource element (RE). The transmission sequence of a PRS is generated by a pseudo-random sequence generator. The pseudo-random sequence generator is initializing for each OFDM symbol, as a function of a slot index, an OFDM symbol index, a cyclic prefix type, and a physical cell ID. The generated sequences are mapped in a manner shown in FIG. 7A in a case of a normal CP. On the other hand, in a case of an extended CP, the generated sequences are mapped in a manner shown in FIG. 7B. The position of the mapped RE may be shifted on the frequency axis, and the amount of the shift may be determined depending on the physical cell ID. FIGS. 7A and 7B show the positions of the PRS transmission REs for a case where the frequency shift is 0.

Meanwhile, the aforementioned RSTD may refer to a relative timing difference between an adjacent or neighboring cell j and a reference cell i. That is, the RSTD may be represented by $T_{subframeRxj} - T_{subframeRxi}$, $T_{subframeRxj}$ is a time point at which the UE receives the head of a specific subframe from a neighboring cell j, and $T_{subframeRxi}$ is a time point at which the UE receives the head of a subframe corresponding to the specific subframe from a reference cell i that is temporally closest to the specific subframe. A reference point used to calculate the observed subframe time difference is an antenna connector of the UE.

As described above, in a radio communication system, in order for a network to acquire location information of a terminal, various methods are used.

The above methods are based on position estimation using three or more references. For example, a GPS positioning technique in which a terminal receives signals from three satellites as references or a location estimation technique for estimating a location using signals received from three base stations as references can be used. In another example, instead of a case where a terminal receives signals from three base stations for position estimation, the contrary is also possible. That is, position measurement can be performed in a manner that three base stations receive signals from one terminal and perform location estimation based on the signals. However, the above-described techniques are difficult to identify the exact location and thus the identified location may have an error when the techniques are used in a normal wireless communication environment that does not guarantee the environment of propagation of line of sight (LOS). In addition, given the battery power consumption of the terminal, an efficient and accurate positioning technique is required. That is, a method of increasing positioning accuracy and of reducing power used for positioning is required.

An efficient accurate position measurement can be performed by using one of the following methods: array processing that reflects a multiple-input-multiple-output (MIMO) environment or a multiple-beam environment among many possible environments in new radio (NR) or millimeter wave (mmWave) networks; and using a Fresnel zone indicating an ellipsoidal region of space between and around a transmitter and a receiver.

For example, one base station and a terminal can perform position measurement based on beamforming, using a plurality of carriers and an angular difference between each of the beams. This will be further described later.

In NR and mmWave networks, an improved-resolution position measurement technique that reflects array processing, multiple beam management, and Fresnel zone effects may be used.

Figure 8:
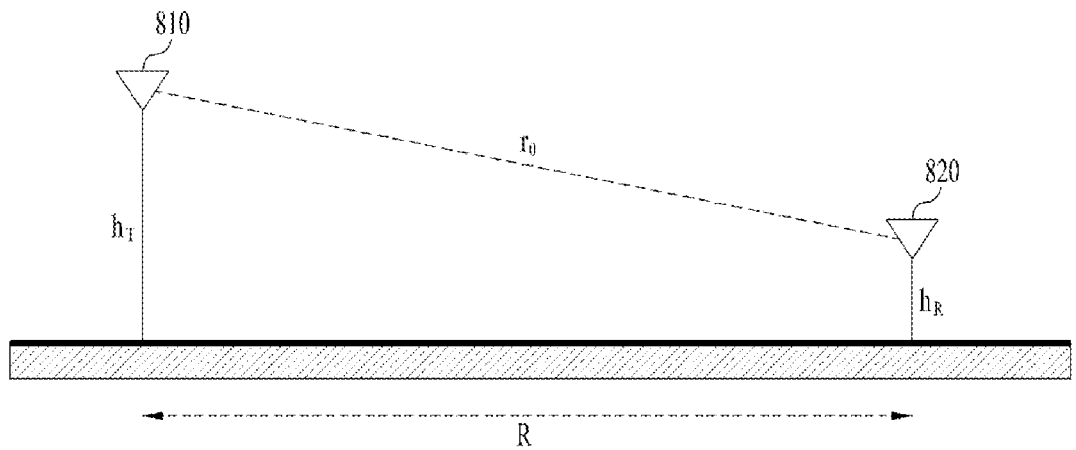
FIG. 8 is a diagram illustrating a transmission path along which a beam is sent to a terminal from a base station.

FIG. 8 is a diagram illustrating propagation characteristics. In an environment in which a signal radiated or transmitted from a transmitter 810 can reach a receiver 820, the propagation characteristics are expressed by Formula 1.

$$P_R = P_T \frac{A}{r^n} \qquad \text{[Formula 1]}$$

Here, $P_R$ represents a received power and $P_T$ represents a transmitted power. In addition, A and n respectively represent an amplitude and a range index that depends on frequency, antenna height, and buildings. For example, n=2 in a space without any interference. On a flat earth surface, n=4. In this case, on the assumption that a light wave is radiated from the outer surface area ($4\pi r^2$) of a sphere and is then distributed, the received power usually varies depending on the term of $$\frac{1}{r^2}$$

and a value related to the direction of an antenna.

When the receiver 820 calculates the received power, a two ray model and a light-of-sight (LOS) path that reflects an effective area will be used. In addition, Formula 2 and Formula 3 are established on the assumption that the value of the distance (large $R \gg h_T$, $h_R$) between the transmitter 810 and the receiver 820 is greater than the value of the height of each of the transmitter 810 and the receiver 820, the LOS path is $r_0$, and the reflection path is $r_1$.

$$r_{0,1} = \sqrt{R^2 + (h_T \pm h_R)^2} \approx R + \frac{1}{2R}(h_T \mp h_R)^2 = \qquad \text{[Formula 2]}$$
$$R + \frac{1}{2R}(h_T + h_R)^2 \mp \frac{h_T h_R}{R}$$

$$P_R \left(\frac{\lambda}{4\pi}\right)^2 \left|\frac{1}{r_0} e^{-jkr_0} + \Gamma(\theta_{ref})\frac{1}{r_1} e^{-jkr_1}\right|^2 \qquad \text{[Formula 3]}$$

Here, $$\Gamma(\theta_{ref}) = \frac{\cos\theta_{ref} - a\sqrt{\epsilon_r - \sin^2\theta_{ref}}}{\cos\theta_{ref} + a\sqrt{\epsilon_r - \sin^2\theta_{ref}}},$$

where "a" is $$\frac{1}{\epsilon_r}$$

for vertical (TM) polarization, and 1 for horizontal (TE) polarization. Since $\Gamma(\theta_{ref}) \approx -1$ is substantially established, the received power can be expressed by Formula 4.

$$P_R = P_T \left(\frac{\lambda}{4\pi R}\right)^2 \left|e^{jk\frac{h_T h_R}{R}} - e^{-jk\frac{h_T h_R}{R}}\right|^2 = \qquad \text{[Formula 4]}$$

-continued $$P_T\left(\frac{\lambda}{4\pi R}\right)^2 \left|2\sin\left(2\pi\frac{h_T h_R}{\lambda R}\right)\right|^2$$

Figure 9:
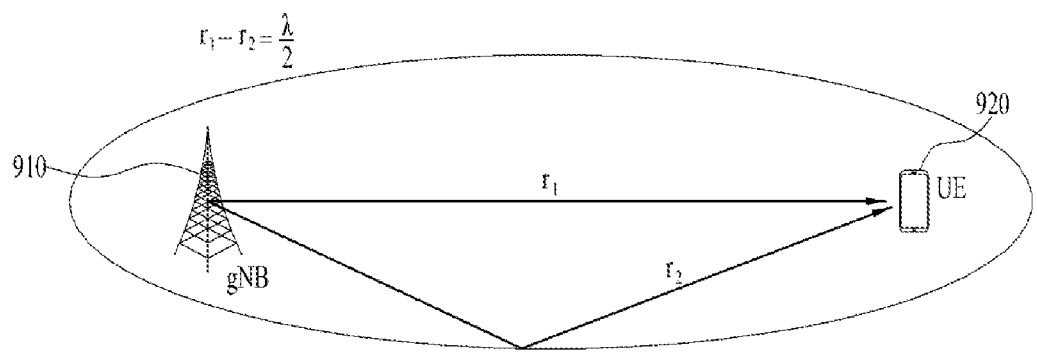
FIG. 9 is a diagram illustrating a transmission path along which a beam is sent to a terminal from a base station.
Figure 10:
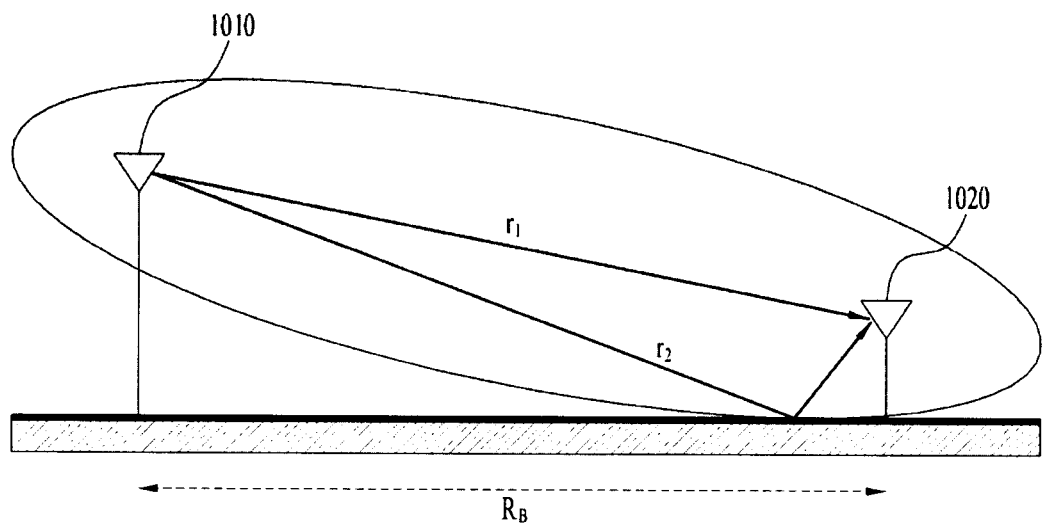
FIG. 10 is a diagram illustrating a transmission path along which a beam is sent to a terminal from a base station.

For example, FIGS. 9 and 10 are diagrams illustrating a propagation region defined based on a Fresnel zone.

For example, the Fresnel zone refers to a confocal prolate ellipsoidal region of space between and around a transmitter 910 and a receiver 920. With respect to the Fresnel zone described above, ray fields can propagate within the Fresnel zone. Although objects located outside the Fresnel zone generate new signals, the signals are likely to have little effect on a direct ray propagating along the LOS. However, objects located inside the Fresnel zone are likely to change the field of a direct ray propagating along the LOS.

In this case, referring to FIG. 10, the Fresnel zone is defined as $$r_1 - r_2 = \frac{\lambda}{2}.$$

In this case, $\lambda$ is a wavelength of a signal transmitted from a transmitter 1010. When the signal propagates from the transmitter 1010, the Fresnel zone is formed depending on the distance between the transmitter and a receiver 1020. Since the signal reflects off the ground surface and then propagates into the receiver 1020, the Fresnel zone comes into contact with the ground surface while maintaining its shape. Therefore, a break point occurs. In this case, $R_B$ is estimated according to Formula 5, and it is calculated as $$R_B \cong \frac{4h_T h_R}{\lambda}.$$

$$\frac{\lambda}{2} = r_2 - r_1 = \sqrt{R_B^2 + (h_T + h_R)^2} - \sqrt{R_B^2 + (h_T - h_R)^2} \approx \frac{2h_T - h_R}{R_B}$$ [Formula 5]

Figure 11:
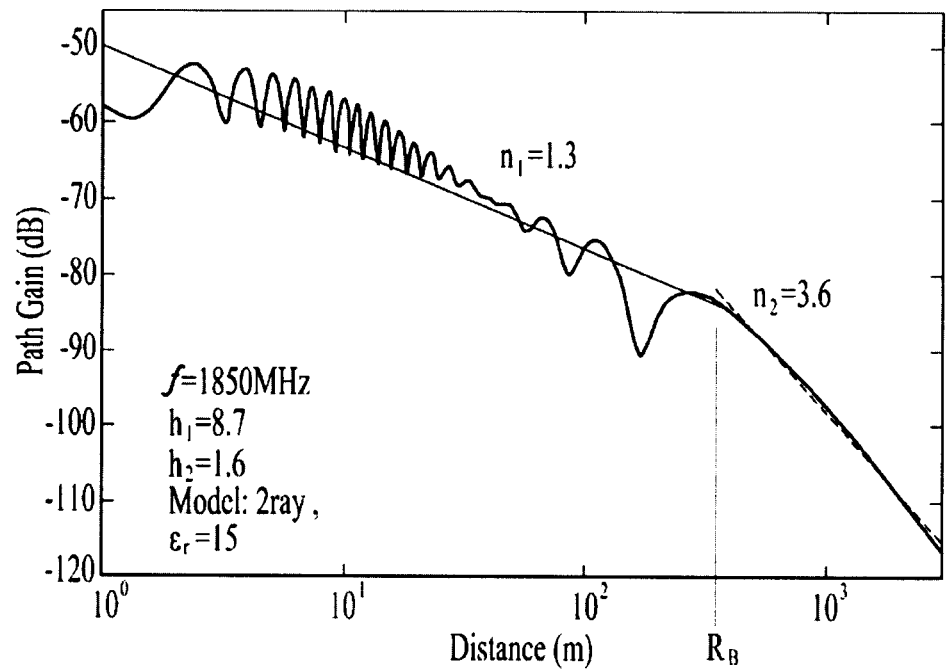
FIG. 11 is a diagram illustrating a gain of a beam according to a break point.

In this case, for example, as illustrated in FIG. 11, the break point indicates a point from which attenuation of signal power with the distance of propagation dramatically increases. For example, a six-ray model may be used. However, even in the case of the six-ray model, the value of the characteristic less fluctuates but the dominant characteristic is almost the same as that of the two-ray model. That is, even with the two-ray model, signal measurement at the receiver can be sufficiently analyzed. The received power obtained with the two-ray model is represented by Formula 6.

$$P_R = P_T\left(\frac{\lambda}{4\pi R}\right)^2 \left|2\sin\left(2\pi\frac{h_T h_R}{\lambda R}\right)\right|^2$$ [Formula 6]

In this case, $$P_R = 4P_T\left(\frac{\lambda}{4\pi R}\right)^2$$

is established at $$R_B \cong \frac{4h_1 h_2}{\lambda}.$$

In addition, when R is a sufficiently large value, $$P_R = P_T \frac{h_T^2 h_R^2}{R^4}$$

is established, given $$R\left(\frac{h_T h_R}{\lambda R} \ll 1\right).$$

On the other hand, the received power has a characteristic that is proportional to the distance and, specifically, to $$\frac{1}{R^4}.$$

In a free space state with no obstacles, the received power is usually proportional to $$\frac{1}{R^2},$$

and the received power is further reduced in proportion to the distance.

Therefore, hereinafter, a method of performing location tracking using a plurality of beams that is likely to occur in NR and mmWave networks and using propagation characteristics at the transmitter and the receiver will be described.

Figure 12:
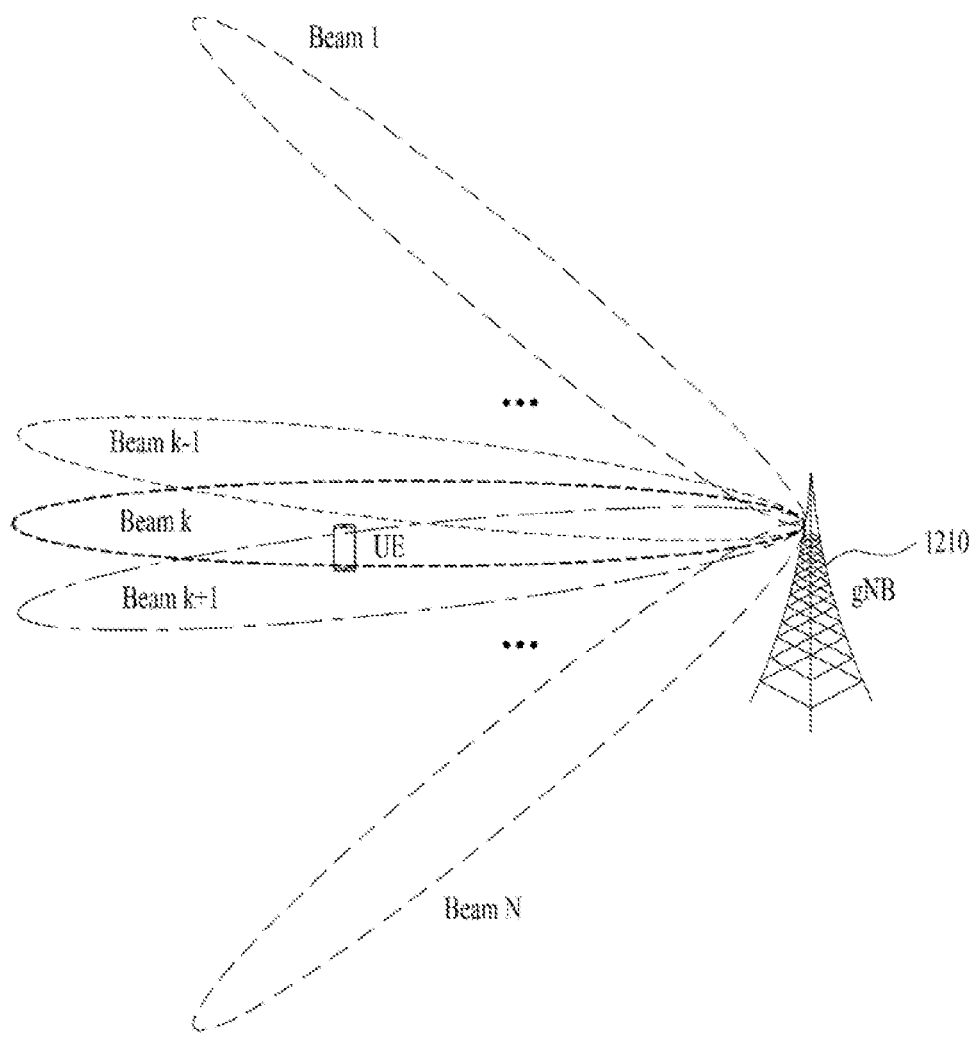
FIG. 12 is a diagram illustrating a method in which a base station transmits a signal using a beamforming technique.

For example, referring to FIG. 12, one base station 1210 may generate a plurality of beams. That is, a signal can be transmitted through beamforming. In this case, for example, an angle between each of the beams is regarded as $\theta_{beam}$. In addition, it is assumed that the transmitted power of each beam is the same. In this case, multiple beams propagate from the base station to the terminals within the coverage, and each terminal can perform location tracking based on received beams.

Case 1

In the case where a base station can generate a plurality of beams but only one carrier is used for location tracking, a received signal analyzed by using the Fresnel zone described above may be expressed by Formula 6. In this case, since each beam has a power difference of $|\sin \theta_{beam}|^2$ from other beams as indicated by Formula 6, the total power difference may be calculated according to Formula 7.

$$\frac{P_{R_{beam\,k}}}{P_{R_{beam\,k+1}}} \approx \sin^2\theta_{beam} \left|\frac{\sin 2\pi \frac{h_T h_R}{\lambda R}}{\sin 2\pi \frac{h_T h_R}{\lambda R \sin\theta_{beam}}}\right|^2$$ [Formula 7]

Where $P_{R_{beam\,k}}$, $P_{R_{beam\,k+1}}$ may be a measured power value. In addition, $\theta_{beam}$, $h_T$, $h_R$, $\lambda$ may be a given value, and an R value may be obtained or estimated according to the above formula.

For example, in a system in which one carrier frequency is used, in a method of obtaining an angle-of-arrival (i.e., LOS path) of a signal, the case where a linear antenna array at the receiver has an antenna spacing of d may be considered. In this case, since space time array processing is performed, a delay between each of the arrays may be d sin $\theta_i$, and thus the k-th antenna element may represent a total delay of (k−1)d sin $\theta_i$. That is, a delay time may be $$\tau_k = \frac{(k-1)d\sin\theta_i}{c}.$$

In this case, a carrier phase shift is $$e^{j2\pi f_0 \tau_k} = e^{\frac{j2\pi f_0(k-1)d\sin\theta_i}{c}}.$$

Using this, it is possible to obtain an angle (direction) of incidence of a beam that is regarded as LOS with reference to the carrier phase shift. That is, the distance and the phase information can be obtained through the above-described method, whereby position measurement can be performed.

Case 2

In this case, position measurement may be performed by using multiple carriers and multiple beams in a system. The multiple carriers may be independently applicable to each of the multiple beams. That is, position measurement can be performed based on the difference between each of the multiple carriers related to one beam. For example, when considering a carrier index i for one beam, the power of the received signal may be calculated according to Formula 8.

$$P_{R_i} = P_T\left(\frac{\lambda_i}{4\pi R}\right)^2 \left|2\sin\left(2\pi\frac{h_T h_R}{\lambda_i R}\right)\right|^2 \quad \text{[Formula 8]}$$

When R is sufficiently large due to the far-field effect when considering the dominant effect in each carrier $$\left(R\left(\frac{h_T h_R}{\lambda R}\right) << 1\right),$$

the powers of the received signals may represent similar values. When the received power is $$P_R = P_T \frac{h_T^2 h_R^2}{R^4},$$

the distance R may be calculated according to Formula 9.

$$R \approx \sqrt[4]{\frac{P_T}{P_R} h_T^2 h_R^2} \quad \text{[Formula 9]}$$

The direction of a beam can be obtained by using an antenna spacing d given a linear array and space time array processing. In this case, when the powers received from the respective carriers are different, the terminal may recognize that the distance is not the extent of a far-field. That is, the terminal may recognize that the distance is not sufficiently far. The ratio of each power is calculated according to Formula 10. In this case, $P_{R_i}$, $P_{R_{i+1}}$ may be a measured value and $\theta_{beam}$, $h_T$, $h_R$, $\lambda$ may be a given value. Therefore, R can be obtained or estimated according to Formula 10.

$$\frac{P_{R_1}}{P_{R_{i+1}}} \approx \left(\frac{\lambda_i}{\lambda_{i+1}}\right)^2 \left|\frac{\sin 2\pi \frac{h_T^2 h_R^2}{\lambda_i R}}{\sin 2\pi \frac{h_T^2 h_R^2}{\lambda_{i+1} R}}\right|^2 \quad \text{[Formula 10]}$$

Case 3

In this case, multiple beams may be applied and multiple carriers may be applied to each of the multiple beams. When analyzing in the same manner as described above, the results can be obtained according to Formula 11. Here, $P_{R_i}$, $P_{R_{i+1}}$ is a measured value and $h_T$, $h_R$, $\lambda_i$, $\lambda_{i+1}$, $\theta_{beam}$ is a given value. Therefore, by using this, R can be obtained or estimated.

$$\frac{P_{R_1}}{P_{R_{i+1}}} \approx \sin^2\theta_{beam}\left(\frac{\lambda_i}{\lambda_{i+1}}\right)^2 \left|\frac{\sin 2\pi \frac{h_T^2 h_R^2}{\lambda_i R}}{\sin 2\pi \frac{h_T h_R}{\lambda_{i+1} R\sin\theta_{beam}}}\right|^2 \quad \text{[Formula 11]}$$

Using the methods described above, it is possible to estimate the location of a terminal in a multi-beam system. A specific procedure for estimating or measuring the location of a terminal will be described below as an embodiment.

Embodiment

A base station and a terminal can trigger a positioning mechanism. To trigger the positioning mechanism, the base station and the terminal share information shown in Table 14. For example, the base station may share the information shown in Table 14 with the terminal by using a system information block (SIB). Alternatively, the base station may transmit the information shown in Table 14 to the terminal using an upper-layer signal. Further alternatively, the base station can transmit the information shown in Table 14 using a dedicated means. However, the present disclosure is not limited to the examples described above.

For example, the information shared between the terminal and the base station may include the number of beams, an angle of each beam, and an altitude from which a beam is transmitted at the base station. For example, beamforming configuration may be 2-bit information indicating any case among Case 1, Case 2, and Case 3.

TABLE 14

N : tile number of available beams
$\theta_{beam}$ : beam difference angle
$h_T$ : a height from which a beam is transmitted at a base station (altitude, . . . )
Beamforming Configuration
00 : Single carrier
01 : Multiple carriers level positioning
10 : Multiple Beams & Multiple carriers level positioning Next, the base station eNB may trigger the beam positioning mechanism by transmitting to the terminal, using system information or specific control signaling.

Next, the terminal may receive the beam positioning-related information from the base station and trigger the beam positioning mechanism. The terminal may measure the signal received from the base station. For example, measurement information may include at least one among RSPR, RSRQ, and CQI. The measurement information may be information not mentioned above. The present disclosure is not limited the examples described above.

For example, when the beamforming configuration information has a value of "00" which indicates the case where multiple beams are applied but only one carrier is used for beam positioning, the terminal may measure each of the beams. Next, the terminal may estimate R from $$\frac{P_{R_{beam\ k}}}{P_{R_{beam\ k+1}}} \approx \sin^2\theta_{beam} \left| \frac{\sin 2\pi \frac{h_T h_R}{\lambda R}}{\sin 2\pi \frac{h_T h_R}{\lambda R \sin\theta_{beam}}} \right|^2$$

and obtain the direction of each beam by using an antenna spacing d of a linear antenna array and space time array spacing. Next, the terminal may report the R, the beam index, $h_R$, and the angle $\theta_i$ of each beam to the base station.

On the other hand, when the beamforming configuration information has a value of "01" which indicates the case where beam positioning is performed by applying a beam to each of multiple carriers, the terminal may independently recognize the beams carried by the respective carriers. In this case, as described above, when the power of the received beam carried by each carrier is similar to each other, the terminal may regard that the base station is positioned in a far field, and calculate the distance according to $$R \approx \sqrt[4]{\frac{P_T}{P_R} h_T^2 h_R^2}.$$

In addition, the direction of each beam can be obtained by applying an antenna spacing d of a linear antenna array and space time array spacing. Next, the terminal may report the R, the beam index, $h_R$, and the angle $\theta_i$ of each beam to the base station.

On the other hand, when the beamforming configuration information has a value of "11", the value indicates the case where multiple carriers are applied to multiple beams. In this case, in the same manner as described above, the distance and the direction can be obtained based on $$\frac{P_{R_1}}{P_{R_{i+1}}} \approx \sin^2\theta_{beam}\left(\frac{\lambda_i}{\lambda_{i+1}}\right)^2 \left| \frac{\sin 2\pi \frac{h_T h_R}{\lambda_i R}}{\sin 2\pi \frac{h_T h_R}{\lambda_{i+1} R \sin\theta_{beam}}} \right|^2,$$

and the obtained information may be reported to the base station.

After the base station receives the positioning information, the base station may share the location information of the terminal with base stations that want to track the location of the terminal within the network. Therefore, other base stations can obtain the position information of the terminal.

FIG. 13 is a diagram illustrating a method of transmitting information required to measure a position of a terminal.

As described above, a terminal may trigger a beam positioning mechanism (S1310). At this time, as illustrated in FIGS. 1 to 12, in the case where the terminal uses a beamforming scheme to perform position measurement in conjunction with one base station, information on each beam may be used to measure a position. To do this, the terminal may trigger the beam positioning mechanism. As described above, the terminal may share information on the beam positioning mechanism with the base station before triggering the beam positioning mechanism. For example, the terminal can receive the information on the beam positioning mechanism via SIB or an upper-layer signal from the base station. The information on the beam positioning mechanism may include the number of available beams, angle information of each beam, an altitude information from which a beam is transmitted at the base station, the beamforming configuration information, or any combination thereof.

Next, the terminal may receive a beam positioning-related signal from the base station (S1320). Next, the terminal may measure the beam positioning-related signal (S1330). As illustrated in FIGS. 1 to 12, the beam positioning-related signal may be a reference signal. That is, the beam positioning-related signal may be a reference signal related to each beam. The terminal may measure RSRP, RSRQ, CQI, or any combination thereof based on the beam positioning-related signal.

Next, the terminal may obtain position measurement information using measurement values based on the beam positioning-related signal (S1340). As illustrated in FIGS. 1 to 12, the terminal can use another method to obtain the position measurement information based on the beamforming configuration. The beamforming configuration information refers to information related to beam positioning and it may be shared between the terminal and the base station. The base station may give an instruction to the terminal by setting the beamforming configuration information to a specific value in the beam positioning triggering information. The terminal may obtain information required to measure a position thereof according to the beamforming configuration. For example, when the beamforming configuration has a first value of "00", the terminal may obtain position measurement information, using multiple beams carried by one carrier. Specifically, the terminal may measure the power of each beam and obtain distance information among various types of the position information based on a beam power difference between each of the multiple beams. In addition, the terminal may obtain direction information among various types of the position information from an antenna array. Specifically, it is possible to determine the direction by performing the space type array processing while considering the antenna spacing d of a linear antenna at a receiver side.

On the other hand, when the beamforming configuration has a second value of "01", the terminal may obtain position measurement information, using the same beam carried by each of the multiple carriers. The terminal may measure the power of each beam carried by each of the multiple carriers and obtains distance information among various types of the position information based on a power difference between each of the beams carried by the respective carriers. In a similar manner to the method described above, the terminal may obtain direction information among various types of the position information from the antenna array.

On the other hand, when the beamforming configuration has a third value of "10", the terminal obtains position measurement information, using multiple beams carried by respectively different carriers. The terminal may measure the power of each beam carried by each of the multiple carriers and obtain distance information among various types of the position information based on a power difference between each of the beams carried by the respective carriers. In a similar manner to the method described above, the terminal may obtain direction information among various types of the position information from the antenna array.

A specific value (for example, "11") of the values of the beamforming configuration may be a reserved value to be used for a different purpose. However, the present disclosure is not limited thereto.

Next, the terminal may transmit the position measurement information to the base station (S1350). As illustrated in FIGS. 1 to 15, the position measurement information transmitted by the terminal may be shared with other base stations. Through this operation, the location of the terminal can be identified, and thus various radio transmission services can be provided to the terminal.

Embodiments of the present disclosure described above can be implemented in various forms. For example, the embodiments may be implemented by hardware, firmware, software, or a combination thereof.

When implemented by hardware, each of the methods corresponding to the embodiments of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, micro controllers, or micro-processors.

When implemented by firmware or software, each of the methods corresponding to the embodiments of the present disclosure may be implemented as a module, procedure, or function that performs the functions or operations described above. A software code may be stored in a memory unit and driven by a processor. The memory unit is positioned inside or outside the processor, and can exchange data with the processor, through various known means.

The detailed description of the preferred embodiments of the present disclosure is provided to enable those skilled in the art to implement and practice the present disclosure. Although described above with reference to the preferred embodiments of the present disclosure, it will be appreciated that those skilled in the art variously modify and change the present disclosure without departing from the spirit and scope of the present disclosure as set forth in the appended claims. Accordingly, the embodiments described above should not be construed to limit the scope of the present disclosure but should be construed to broaden the scope of the present disclosure within the extent that is consistent with the principles and novel features disclosed herein. Although the preferred embodiments of the present disclosure have been disclosed for illustrative purposes, those skilled in the art will appreciate that various modifications, additions, and substitutions are possible, without departing from the scope or spirit of the invention stated in the appended claims. It is thus well known to those skilled in the art that the present disclosure is not limited to the embodiments disclosed in the detailed description but rather cover various modifications, additions, substitutions, and equivalents.

In the above description, both a device and a process as the present disclosures are described, and the description of each of the inventions supplement to the description of the other.

INDUSTRIAL APPLICABILITY

The above description can be applied to other radio communication systems such as IEEE802.16x systems and IEEE802.11x systems as well as 3GPP LTE and LTE-A systems. Furthermore, the proposed method can be applied to communication systems using an ultra-high frequency band.

The invention claimed is:

1. A method of transmitting position measurement information by a terminal in a wireless communication system, the method comprising:
   receiving first information related to a position mechanism;
   receiving second information for requesting the position mechanism;
   receiving a positioning-related signal from a base station;
   based on the first and second information and the positioning-related signal, measuring the positioning-related signal;
   acquiring the position measurement information based on the measurement of the positioning-related signal; and
   transmitting the acquired position measurement information,
   wherein the first information includes angle information of each of available beams, altitude information from which each of available beams is transmitted at the base station, and beamforming configuration information,
   wherein a number of carriers and a number of beams for acquiring the position measurement information are determined based on the beamforming configuration information, and
   wherein the beamforming configuration information comprises two bits,
   based on a first value of the beamforming configuration information, the terminal measures the positioning-related signal from multiple beams that are carried by one carrier,
   based on a second value of the beamforming configuration information, the terminal measures the positioning-related signal from a beam that is carried by multiple carriers, and
   based on a third value of the beamforming configuration information, the terminal measures the positioning-related signal from multiple beams that are carried by multiple carriers.

2. The method according to claim 1, wherein based on the first value of the beamforming configuration information, the terminal acquires distance information of the position measurement information based on power information of the multiple beams and acquires direction information of the position measurement information from an antenna array of the terminal.

3. The method according to claim 1, wherein based on the second value of the beamforming configuration information, the terminal acquires distance information of the position measurement information based on power information of each of the multiple beams carried respectively by the multiple carriers, and acquires direction information of the position measurement information from an antenna array of the terminal.

4. The method according to claim 1, wherein based on the third value of the beamforming configuration information, the terminal acquires distance information of the position measurement information based on power information of each of the multiple beams that are transmitted by the multiple carriers, and acquires direction information of the position measurement information from an antenna array of the terminal.

5. The method according to claim 1, wherein the position measurement information is shared among a plurality of base stations.

6. A terminal configured to transmit position measurement information in a wireless communication system, the terminal comprising:
- a receiver configured to receive a signal;
- a transmitter configured to transmit a signal; and
- a processor configured to control the receiver and the transmitter,
- wherein the processor is configured to:
- receive first information related to a position mechanism;
- receive second information for requesting the position mechanism;
- receive a positioning-related signal from a base station;
- based on the first and second information and the positioning-related signal, measure the positioning-related signal;
- acquire the position measurement information based on the measurement of the positioning-related signal; and
- transmit the position measurement information,
- wherein the first information includes angle information of each of available beams, altitude information from which each of available beams is transmitted at the base station, and beamforming configuration information,
- wherein a number of carriers and a number of beams for acquiring the position measurement information are determined based on the beamforming configuration information,
- wherein the beamforming configuration information comprises two bits,
- based on a first value of the beamforming configuration information, the processor measures the positioning-related signal from multiple beams that are carried by one carrier,
- based on a second value of the beamforming configuration information, the processor measures the positioning-related signal from a beam that are carried by multiple carriers, and
- based on a third value of the beamforming configuration information, the processor measures the positioning-related signal from multiple beams that are carried by multiple carriers.

7. The terminal according to claim 6, wherein based on the first value of the beamforming configuration information, the processor acquires distance information of the position measurement information based on power information of the multiple beams and acquires direction information of the position measurement information from an antenna array of the terminal.

8. The terminal according to claim 6, wherein based on the second value of the beamforming configuration information, the processor acquires distance information of the position measurement information based on power information of each of the multiple beams carried respectively by the multiple carriers, and acquires direction information of the position measurement information from an antenna array of the terminal.

9. The terminal according to claim 6, wherein based on the third value of the beamforming configuration information, the processor acquires distance information of the position measurement information based on power information of each of the multiple beams that are transmitted by the multiple carriers, and acquires direction information of the position measurement information from an antenna array of the terminal.

10. The terminal according to claim 9, wherein the position information is shared among a plurality of base stations.

* * * * *